INVENTORS
WEN LING KUO
JOHN R. ANDERSON
BY
ATTORNEY

United States Patent Office 3,554,691
Patented Jan. 12, 1971

3,554,691
GAS PURIFICATION PROCESS
Wen Ling Kuo, Tarrytown, and John R. Anderson,
Mount Kisco, N.Y., assignors to Union Carbide Corporation, a corporation of New York
Filed June 11, 1968, Ser. No. 736,056
Int. Cl. B01d 13/02, 53/00
U.S. Cl. 23—2
22 Claims

ABSTRACT OF THE DISCLOSURE

A process for purifying natural gas streams and synthesis gas streams containing acid gases by employing alkanolamine absorbents to absorb the acid gases and regenerating the absorbents by feeding the absorbents containing the absorbed acid gases into an electrodialyzer which separates the acid gases from the absorbent. The aborbent, substantially free of acid gases in recycled in the process for further contact with gas.

---

Figure 1:
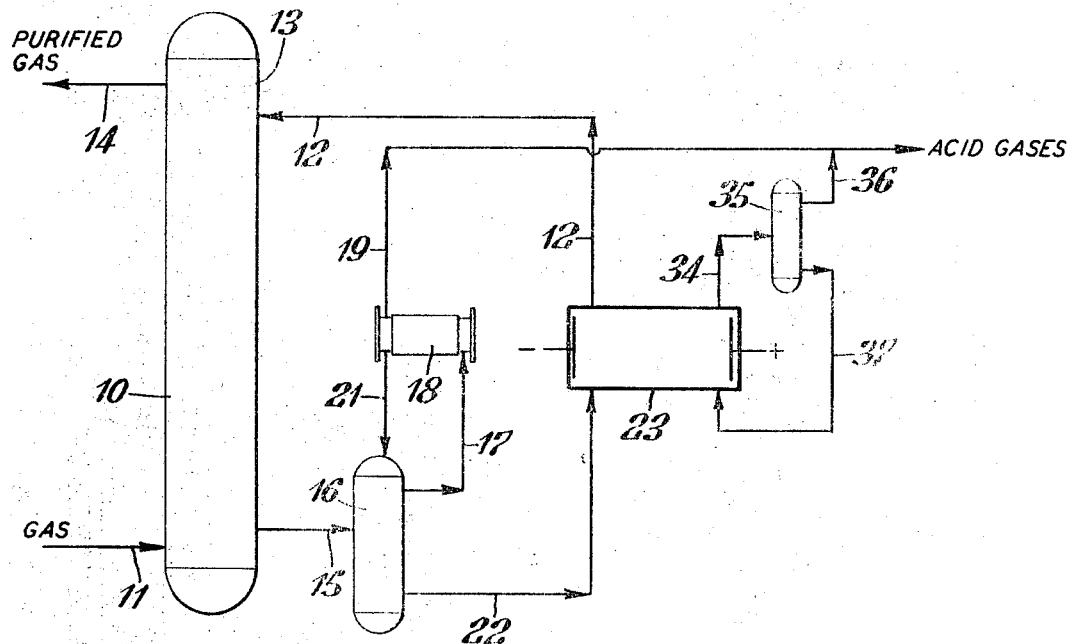

This invention relates to an improved gas purification process and more particularly to a process for treating natural, refinery, inert atmospheres, flue gases and synthesis gases to remove undesirable acidic gases therefrom.

Present gas purification processes normally utilize one of three basic operations or techniques, i.e. absorption of vapor-phase impurities into a liquid, absorption on a solid and chemical conversion to another compound. Absorption by chemical conversion is considered the most important of these gas-purification techniques and is common to a great number of processes. As is well known, alkanolamines, particularly ethanolamines, are widely used as absorbers in the last of the above-mentioned techniques and are ideally suited for the treatment of natural, refinery and synthesis gases which contain acidic gases such as carbon dioxide and/or hydrogen sulfide.

In a typical technique of operation, the gas to be purified is passed upward through an absorber countercurrent to a stream of absorbent solution such as an alkanolamine solution. The rich solution collected from the bottom of the absorber containing the alkanolamine and acidic gases dissolved therein such as carbon dioxide and/or hydrogen sulfide is thereafter passed through a stripping column operated at relatively high temperature wherein the rich solution is contacted with steam which strips out the carbon dioxide and/or hydrogen sulfide from the alkanolamine solution. The carbon dioxide and/or hydrogen sulfide are thereafter recovered and the lean alkanolamine solution substantially free of these acid gasses is then recycled to the absorber for further contact with additional incoming gas.

The principal shortcomings of the above described technique exist not in the absorption of the acid gases from the gas stream but rather in the subsequent regeneration of the absorbent, e.g., the rich alkanolamine solution which is a process requirement for efficient and economical operation. For example, the employment of relatively high temperatures in the stripping column, which is necessary for adequate stripping, sometimes causes severe corrosion problems and also may induce degradation of the alkanolamine. Moreover large quantities of steam are required to strip the alkanolamines to a level at which they can be recycled in the process. Under certain circumstances, this can be disadvantageous. Another potential disadvantage of the conventional procedure above described is that the impurities which are normally present in refinery gas streams, such as carboxylic acids and compounds of sulfur, form "so-called" heat stable acid salts of the alkanolamine which normally cannot be separated by steam stripping thereby necessitating additional treatment with strong base in order to effect their removal. This latter procedure is time consuming and adds to the cost of processing.

It is therefor an object of the present invention to provide an improved gas purification process.

Another object is to provide a new efficient method for the economical regeneration of absorbents in gas purification processes.

Another object is to provide an electrodialytic procedure to regenerate gas rich absorbents into a lean basic solution and a weak acid solution, the latter of which can be easily degassed and recovered. These and other objects will become apparent from the following description taken in conjunction with the accompanying drawings.

In accordance with the present invention there is provided a process for purifying natural and synthesis gases containing acid gases which comprises contacting said gases with an alkanolamine solution under conditions wherein said acid gases are absorbed in said alkanolamine solution to form a rich alkanolamine solution, separating and recovering a gas stream product substantially free of said acid gases, regenerating said rich alkanolamine solution by introducing said alkanolamine solution into an electrodialysis apparatus which includes a cathode compartment containing an electrolyte at one terminal end and an anode compartment containing an electrolyte at the opposite terminal end and at least one unit of compartments disposed between said cathode compartment and said anode compartment, said unit including an ion exchange resin-water compartment containing an ion exchange resin and water, a feed compartment, an acid compartment containing an electrolyte and a product compartment containing an alkanolamine solution. Each of the compartments are separated by alternating cation and an anion exchange membrane beginning with a cation membrane in the cathode compartment and terminating with an anion membrane in the anode compartment. The rich alkanolamine solution is introduced into the feed compartment, and thereafter there is passed a direct current potential transversely across each compartment, the current being sufficient to generate anions and cations causing anions to pass through the anion membranes and cations to pass through the cation membranes. As a result there is formed carbon dioxide and/or hydrogen sulfide in the acid compartment and alkanolamine solution substantially free of acid gases in the product compartment. The alkanolamine solution in the product compartment is recycled for further contact with gas, and the acid gases $CO_2$ and/or $H_2S$ are recovered from acid compartment.

Figure 2:
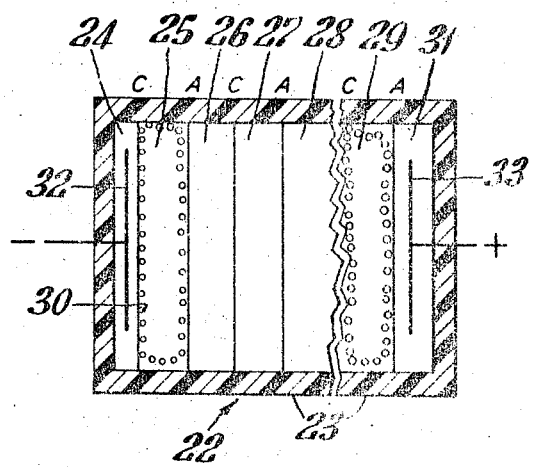
Figure 3:
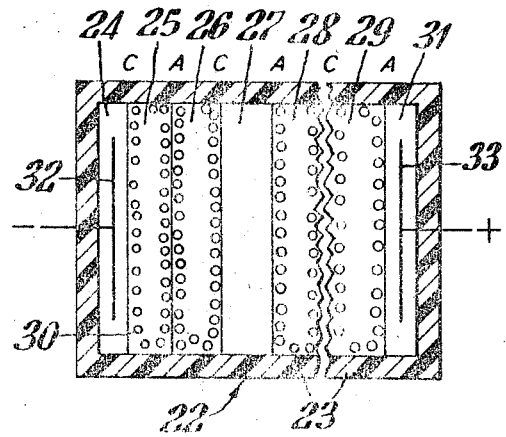

For a clearer understanding of the invention, reference is made to the drawings in which FIG. 1 is a diagrammatic flow sheet illustrating the process of the present invention. FIG. 2 is an enlarged cross-sectional view partially diagrammatic and simplified of one type of electrodialyzer apparatus which can be employed in the process illustrated in FIG. 1. FIG. 3 is an enlarged cross-sectional view partially diagrammatic and simplified of another and preferred type of electrodialyzer apparatus which can be employed in the process illustrated in FIG. 1.

Referring to FIG. 1, the gas stream obtained for example from natural gas wells and containing about 10% carbon dioxide and 15% hydrogen sulfide or a synthesis gas containing 15% $CO_2$ and no $H_2S$ enters an absorber generally represented by reference numeral 10 through gas inlet 11 positioned at the lower portion of the absorber. The gas stream is passed upward through the absorber countercurrent to a stream of alkanolamine solution which enters the upper portion of the absorber through inlet 12. The absorber 10 is of a conventional type and can be of the packed tower type which is filled with irregular solid packing material or alternatively of the empty tower type into which the absorbing liquid is sprayed. Another type of absorber which can be employed in the present invention is a plate-type unit containing a number of bubble-cap or sieve plates. The particular design of the absorber would of course depend upon the chemical and physical characteristics of the materials being contacted, the desired time of contact between the flowing streams and similar conditions which form the conventional basis for determining the most effective type design. The particular design based on the above can be easily determined by one skilled in the art and hence no further detailed discussion appears to be necessary.

The alkanolamines which can be employed as absorbers according to the process of the present invention are those which have been conventionally employed as absorbers in prior art gas purification processes. They are generally characterized as containing at least one hydroxyl group and one amine group and have a low vapor pressure. They have the necessary alkalinity and are capable of reversible regeneration by heat. Merely as illustrative, the alkanolamines and other absorbents which can be employed according to the process of the present invention include alkali metal hydroxide; alkali metal carbonate, water, ammonium hydroxide, trialkanolamine, dialkanolamine and monoalkanolamine. The two alkanolamines which have proven in the past to be of major commercial interest for gas purification are monaethanolamine and diethanolamine and these two alkanolamines when employed in the process of the present invention provide excellent results and are therefore preferred absorbents.

Initially, at the start of the process a fresh alkanolamine solution substantially free of impurities and containing about 85% water by weight is introduced into the absorber 10 through line 13. However, after start-up and during the course of operation, regenerated alkanolamine solution substantially free from impurities is recycled in the process and at this point is referred to as lean alkanolamine solution. In the absorber 10, the acid gases, e.g., the carbon dioxide and/or hydrogen sulfide gases, are absorbed in the alkanolamine solution and a purified gas, i.e., a gas substantially free of acid gases, leaves the upper portion of the absorber through line 14 where it is directed to storage. As mentioned previously, in the absorber 10, the gas entering gas inlet 11 is passed upward countercurrent to a stream of lean alkanolamine solution. Depending upon the proportion of acid gases in the gas stream, the heat of reaction and heat capacity of the solution, the temperature of the rich solution leaving the absorber can be varied over a wide range. When gas streams containing a relatively large proportion of acid gases are purified, the rich solution leaves the absorber at generally elevated temperatures, i.e., temperature of about 100 to 150° F. When the acid gas proportion in the gas is relatively small, the rich solution from the absorber has a temperature substantially the same as that of the incoming gas. Generally temperatures in the absorber are maintained within the range of about 80 to 120° F. preferably at 100° F. It is desirable to flash the rich solution leaving the absorber 10 to room temperature and atmospheric pressure before the rich solution is introduced into an electrodialytic apparatus. Thus the rich alkanolamine solution, i.e., the alkanolamine solution containing the absorbed acid gases is discharged from the absorber 10 through line 15 whereupon it enters a conventional flasher indicated by reference numeral 16. Conditions in the flasher are such as to cause vaporization of the excess acid gases, for example hydrogen sulfide and carbon dioxide which leave the flasher through line 17 together with amounts of protonated alkanolamine, e.g., monoethanolamine hydrogen carbonate, diethanolamine hydrogen carbonate, monoethanolamine hydrosulfide and diethanolamine hydrosulfide, and water vapors, and enter the condenser 18. Temperatures in the flasher are generally maintained within a range of from about 60 to 80° F., preferably at 70° F. The evolved vapors of excess hydrogen sulfide, carbon dioxide, protonated alkanolamine and water are passed through the condenser 18 in contact with a cooling medium which serves to condense the vapors of protonated alkanolamine and the water into liquid and the liquid is thereafter discharged from the condenser through line 21 back to the flasher 16. The excess acid gases are discharged from the condenser 18 through line 19 and recovered. The rich alkanolamine solution containing unremoved acid gases together with additional impurities must be regenerated so that it can be recycled to the absorber for contact with additional gas. This regeneration is effected in an electrodialysis apparatus as hereinafter described. Thus the rich alkanolamine solution is discharged from the flasher 16 through line 22 and enters an electrodialysis apparatus represented by reference numeral 23.

Referring to FIG. 2 it will be seen that the electro dialysis apparatus includes a tank or container 23 which is subdivided into a plurality of chambers or compartments 24, 25, 26, 27, 28, 29 and 31. The terminal compartments 24 and 31 contain electrodes 32 and 33. The electrode 32 is connected to the negative pole (cathode) of a source of energy (not shown) so that compartment 24 can be defined as a cathode compartment whereas the electrode 33 is connected to the positive pole (anode) of a source of energy making the electrode compartment 31 an anode compartment. The anodes and cathodes are constructed of a material which is durable to the fluids present in the electrode chambers and can be constructed from materials such as silver, copper, platinum, carbon and stainless steel. The compartments 25 through 28 are designated generally as intermediate compartments. The compartment 27 accommodates the feed solution i.e., the rich alkanolamine solution from the flasher 16 and is therefore termed the feed compartment. The compartment 25 contains distilled water and an ion exchange resin as will be described hereinafter, and is termed the resin-water compartment, and compartments 26 and 28, the product and acid compartment respectively. These compartments are separated by fluid separating membranes identified by the letters C and A.

There are several types of commercially available membranes which can be employed according to the process of the present invention. A certain type of commercially available membrane has the property of being permeable to anions and passage resistant to cations. Such a membrane is commonly referred to as an "anion membrane." As examples of typical anion membrane materials, but not in a limiting sense, may be mentioned "Amfion" A–103, and "Amfion" A–63, all produced by American Machine and Foundry, Springdale, Conn. These anion membranes may be chemically defined as generally comprising a polyethylene backbone and polyelectrolytes of quaternized ammonium in a homogeneous sheet form.

Another type of commercially available membrane has the property of being permeable to cations and passage resistant to anions. Such a membrane is commonly referred to as a "cation membrane." As examples of typical membrane materials may be mentioned "Amfion" C–103 of American Machine and Foundry. These cation membranes can be chemically defined as generally comprising a polyethylene backbone and polyelectrolytes of sulfonic acid in a homogeneous sheet form. However, similar materials are also produced by other manufacturers for example, by Ionics, Inc. of Cambridge, Mass.

These membranes are arranged in sequence as shown in FIG. 2 of the drawings, that is adjacent the cathode compartment 24 is located a cation membrane identified by the letter C—then an anion membrane identified by the letter A— a cation membrane—an anion membrane— a cation membrane and adjacent the anode compartment is located an anion membrane.

It will of course, be understood that the apparatus is equipped with fluid inlet means and outlet means for introducing and discharging the various materials from the compartments. In addition, the membranes can be mounted in conventional frames as is known in the art but for purposes of simplicity these detailed features are not described herein. It should also be understood, that the apparatus illustrated in FIG. 2 contains seven compartments i.e., two electrode compartments and a unit of intermediate compartments 25 through 28, and an extra water-resin compartment 29, and that this arrangement is shown merely for purposes of simplicity. In actual practice, however, the apparatus is sized up as indicated by the broken lines in FIG. 2 so as to contain up to about one hundred repeating units between the electrode compartments. Moreover, several of the apparatus containing up to one hundred compartments can be arranged to accommodate the large quantity of absorbent to be regenerated in commercial operations.

Referring again to FIG. 2, it will be seen that the water-resin compartments 25 and 29 are positioned such that one of each compartments is located adjacent an electrode compartment. Water is admitted into the water-resin compartment in substantially pure form, i.e., substantially free of contaminating materials. For this reason it is preferred to employ distilled water. In addition to water being present in the water resin compartments there is also included a filler 30 comprising granular, spherical or fibrous shapes of an ion-exchange resin. Depending upon the type of compounds to be produced there can be employed in the water-resin filled compartments 25 and 29 a strong cation exchange resin such as Amberlite IR-120, Dowex 50 and Amberlite IRC-50 and Permutil 216, a strong anion exchange resin such as Amberlite IRA-400, Amberlite IRA-410 and Dowex 1, a weak anion exchange resin such as IR-43 and Amberlite 112-45, or a weak cation exchange resin and mixtures of the above. It will, of course be understood that the above-mentioned ion exchange resins are cited merely as examples of suitable materials and that there are a variety of other ion exchange resins which can also be employed in the process.

In the water-resin compartments 25 and 29 the water is dissociated into hydrogen and hydroxyl ions formed and these ions pass selectively to the adjacent compartments as will be explained hereinafter.

Located in the compartment immediately adjacent the water-resin compartment 25 in the direction of the cathode compartment 24 is the product compartment 26 wherein the regenerated amine product is collected.

Located adjacent the feed compartment 27 in the direction of the anode compartment 33 is the acid compartment 28 from which is evolved acid gases such as carbon dioxide and hydrogen sulfide. Although the electrodialyzer shown in FIG. 2 is operable and produces satisfactory results, it has been found that an undesirably high electrical resistance is exhibited by the lean or regenerated alkanolamine solution and the acid solution in the respective compartments. For this reason, it is preferred to employ an apparatus as shown in FIG. 3. Referring to FIG. 3 it will be seen that the apparatus is generally as shown in FIG. 2 and therefore certain like parts are given the same reference numerals or letters. However, in order to reduce the electrical resistance in the product and acid compartments, 26 and 28, these compartments are also packed densely with resins 30 of the same type which are contained in the water-resin compartments. The particle size of the resins employed can be varied over a wide range and depends upon a variety of factors such as electrical conductance, hydraulic pressure drop and heat removal. Generally, however, the particle size of the resin can range from about 16 to 400 mesh or 0.991 to 0.037 mm. in diameter.

Prior to start-up, an electrolyte is introduced into the electrode compartments 24 and 31. Examples of suitable electrolytes for this purpose include sulfuric acid, sodium sulfate, and sodium chloride.

In the acid compartment 28, liquid is introduced which has slight solubility for the acid gases and which is also preferably capable of conductivity. Sulfuric acid is particularly suitable for this purpose although other acids, bases and salts can be employed, such as sodium sulfate, sodium chloride and potassium hydroxide. Water saturated with carbon dioxide and/or hydrogen sulfide can also be employed as the liquid particularly when the acid compartment is packed densely with exchange resins as indicated in FIG. 3. The water-resin compartments, 25 and 29 as mentioned previously, are charged with distilled water and packed with resin 30 and into the product compartment 1 is introduced, at start-up, a lean alkanolamine solution. For more efficient performance, it is desirable to include an ion exchange resin 30 in the product compartment 26 and the resin can be of the type employed in the other compartments i.e., the water-resin and acid compartment as shown in FIG. 3. After charging the materials to the compartments as above explained, the rich alkanalamine solution from the flasher 16 is introduced into the feed compartment through line 22 and a direct current of electricity is passed across each compartment. Temperatures employed in the electrodialyzer are within the range of about 60 to 180° F. Under the above described conditions, anions and cations in each compartment tend to migrate toward the electrodes of opposite charge. The cations migrate through the cationic permselective membranes while at the same time the anions migrate through the anionic selective membranes. As a result, a lean alkanolamine solution is continuously obtained in the product compartment 26 substantially free of acid gases and is directed back to the absorber 10 through line 12 for contact with incoming gas. Anions, e.g., $HCO_3^-$ and/or $HS^-$ pass into the acid compartment and form weak acids such as $H_2CO_3$ and/or $H_2S$. The saturated solutions of carbonic acid and/or hydrogen sulfide are continuously discharged from the compartment through line 34 and enter a degassing device 35 wherein the acid gases carbon dioxide and/or hydrogen sulfide, are evolved and continuously discharged through line 36 and merged with acid gases leaving condenser 18 through line 19. Conditions are maintained in the degassing device 35, that is temperatures and pressures are maintained to cause the carbon dioxide and/or hydrogen sulfide to evolve from the acid solution. Temperatures maintained in the degassing device 35 for this purpose are within the range of about 60 to 80° F. under pressures of about half atmosphere and above. The acid solution leaves the degassing device 35 through line 37 and is directed back to the acid compartment 28 of the electrodialyzer 23.

In a representative technique of operation employing monoethanolamine as the absorptive liquid and utilizing the apparatus illustrated in FIGS. 1 and 3, a gas containing the acidic gases hydrogen sulfide and/or carbon dioxide in an amount of 15% and 10% respectively by weight or a synthesis gas containing 15% by weight $CO_2$ and no $H_2S$ enters the bottom of an absorber 10 filled with irregular solid packing material through line 11. A fresh monoethanolamine solution, containing 15% by weight monoethanolamine enters the absorber 10 through line 13, and is passed countercurrent to the gas stream. Temperatures in the absorber are maintained about 100 to 150° F. A purified gas in continuously discharged from the absorber 10 through line 14 whereas the rich monoethanolamine containing the extracted acid gases in solution is discharged from the lower part of the absorber 10 through line 15 and enters the flasher 16 which is maintained at a temperature of about 60 to 80° F. The evolved vapors of excess $H_2S$, $CO_2$ and rich monoethanolamine solution leave the flasher 16 through line 17 and enter the condenser 18 wherein the vapor of rich monoethanalamine solution is condensed and directed back to the flasher 16 through line 21 while excess acid gases $H_2S$ and/or $CO_2$ leave the condenser 18 through line 19 and are recovered. The monoethanolamine solution containing amounts of $H_2S$ and/or $CO_2$ must be regenerated prior to recycle to the absorber 10 and to effect regeneration, the monoethanolamine solution leaves the flasher and enters the feed compartment of a multicompartment electrodialyzer of the type shown in FIG. 3.

The water-resin compartments 25 and 29 are packed densely with a strong cation exchange resin 30 such as a strongly acidic, sulfonated polystyrene type of cation exchange resin in the form of beads and filled with distilled water.

Compartments 26 and 28 are also packed densely with the above type of exchange resin, however in compartment 26 there is also introduced at start-up, a lean monoethanolamine solution, whereas the compartment 28 is filled with a solution of sulfuric acid.

A direct current of electricity is passed through the apparatus and the ions in each compartment tend to migrate toward the electrodes of opposite charge. Hydrogen ions resulting from the dissociation of water in the water resin compartments migrate through the cationic permselective membranes while at the same time the hydroxyl ions resulting from the dissociation of water pass through the anionic selective membranes into the product compartment 26. The anions of the rich monoethanolamine solution tend to migrate toward the anode 33 and pass through the anion membranes into the acid compartment 28 while the cations of protonated monoethanolamine pass through the cation membrane into the product compartment 26.

Anions, e.g., $HCO_3$ and/or $HS^-$ pass into the acid compartment and form weak acids such as $H_2CO_3$ and/or $H_2S$. The saturated solutions of carbonic acid and/or hydrogen sulfide are continuously discharged from the compartment through line 34 and enter a degassing device 35 wherein the acid gases carbon dioxide and/or hydrogen sulfide, are evolved and continuously discharged through line 36 and merged with acid gases leaving condenser 18 through line 19. Conditions are maintained in the degassing device 35, that is temperatures and pressures are maintained to cause the carbon dioxide and/or hydrogen sulfide to evolve the acid solution. Temperatures maintained in the degassing device 35 for this purpose are within the range of about 60 to 80° F. under pressures of about half atmosphere and above. The acid solution leaves the degassing device 35 through line 37 and is directed back to the acid compartment 28 of the electrodialyzer 23.

The following examples are illustrative of the practice of this invention and are not intended to be limiting.

EXAMPLE 1

An electrodialysis apparatus of the type shown in FIG. 2 was employed. It was divided into an anode compartment and a cathode compartment each containing a platinum electrode connecting to a D.C. power supply, a unit of intermediate compartments and an extra water resin compartment. The anode and cathode compartments were filled with 1.0 N sulfuric acid solution, and water-resin compartments 25 and 29 were packed densely with strongly acidic, sulfonated polystyrene-type cation exchange resin ($RSO_3$—$H+$) and filled with distilled water. The feed compartment 27, was filled with 2.46 N monoethanolamine solution partially protonated with carbon dioxide at 0.627 mole $CO_2$/mole monoethanolamine. Compartment number 26 was filled with 2.46 N monoethanolamine solution and compartment number 28 was filled with water saturated with carbon dioxide.

After the cell was in equilibrium with the temperature of the water bath at 25° C., a quantity of current equal to 0.41 eq./liter was passed through the cell. Carbon dioxide was continuously produced in compartment No. 28 whereas analysis of compartments Nos. 27 and 26 by pH titration against 0.1 N hydrochloric and 0.1 N sodium hydroxide standard solutions showed that fresh or lean monoethanolamine was quantitatively regenerated and transferred from compartment No. 27 to compartment No. 26.

EXAMPLE 2

An electrodialysis apparatus of the type shown in FIG. 2 was employed. It was divided into an anode compartment and a cathode compartment each containing a platinum electrode connecting to a D.C. power supply, a unit of intermediate compartments and an extra water resin compartment. The anode and cathode compartments were filled with 1.0 N sulfuric acid solution. The water-resin compartments 25 and 29 were packed densely with strongly acidic, sulfonated polystyrene-type cation exchange resin ($RSO_3$—$H+$) and filled with distilled water. The feed compartment 27, was filled with 2.46 N monoethanolamine solution partially protonated with carbon dioxide at 0.627 mole $CO_2$/mole monoethanolamine. Compartment No. 26 was filled with 2.46 N monoethanolamine solution and compartment No. 28 was filled with 1.0 N sulfuric acid solution.

After the cell was in equilibrium with the temperature of the water bath at 25° C., a quantity of current equal to 0.76 eq./liter was passed through the cell. Carbon dioxide was continuously produced in compartment No. 28 whereas analysis of compartment Nos. 27 and 26 by pH titration against 0.1 N hydrochloric acid and 0.1 N sodium hydroxide standard solutions showed that fresh or lean monoethanolamine was quantitatively regenerated and transferred from compartment No. 27 to compartment No. 26.

EXAMPLE 3

An electrodialysis apparatus of the type shown in FIG. 2 was employed. It was divided into an anode and cathode compartment each containing a platinum electrode connecting to a D.C. power supply, a unit of intermediate compartments and an extra water resin compartment. The anode and cathode compartments were filled with 1.0 N sulfuric acid solution. The water-resin compartments 25 and 29 were packed densely with strongly acidic, sulfonated polystyrene-type cation exchange resin ($RSO_3$—$H+$) and filled with distilled water. The feed compartment 27 was filled with 2.46 N monoethanolamine solution partially protonated with carbon dioxide at 0.627 mole $CO_2$ mole monoethanolamine. Compartment No. 26 was filled with 2.46 N monoethanolamine solution partially protonated with carbon dioxide in order to reduce the electrical resistance at 0.143 mole $CO_2$/mole MEA and compartment No. 28 was filled with 1.0 N sulfuric acid solution.

After the cell was in equilibrium with the temperature of the water bath at 25° C., a quantity of current equal to 1.034 eq./liter was passed through the cell. Carbon dioxide was continuously produced in compartment No. 28 whereas analysis of compartment Nos. 27 and 26 by pH titration against 0.1 N hydrochloric acid and 0.1 N sodium hydroxide standard solutions showed that fresh or lean monoethanolamine was quantitatively regenerated and transferred from compartment No. 27 to compartment No. 26.

EXAMPLE 4

An electrodialysis apparatus of the type shown in FIG. 3 was employed. It was divided into an anode and cathode compartment each containing a platinum electrode connecting to a D.C. power supply, a unit of intermediate compartments and an extra resin compartment. The anode and cathode compartments were filled with 1.0 N sulfuric acid solution. The water-resin compartments 25 and 29 as well as compartments 26 and 28 were packed densely with strongly acidic, sulfonated polystyrene-type cation exchange resin ($RSO_3^-H^+$) and compartments 25 and 29 filled with distilled water. The feed compartment 27 was filled with 2.46 N monoethanolamine solution partially protonated with carbon dioxide at 0.627 mole $CO_2$/mole monoethanolamine. Compartment No. 26 was filled with 2.46 N monoethanolamine solution partially protonated with carbon dioxide at 0.143 mole $CO_2$/mole monoethanolamine and compartment No. 28 was filled with 1.0 N sulfuric acid solution.

After the cell was in equilibrium with the temperature of the water bath at 25° C., a quantity of current equal to 0.937 eq./liter was passed through the cell. Carbon dioxide was continuously produced in compartment No. 28 whereas analysis of compartments Nos. 27 and 26 by pH titration against 0.1 N hydrochloric acid and 0.1 N sodium hydroxide standard solutions showed that fresh or lean monoethanolamine was quantitatively regenerated and transferred from compartment No. 27 to compartment No. 26.

EXAMPLE 5

An electrodialysis apparatus of the type shown in FIG. 2 was employed. It was divided into an anode compartment and a cathode compartment each containing a platinum electrode connecting to a D.C. power supply, a unit of intermediate compartments and an extra water-resin compartment. The anode and cathode compartments were filled with 1.0 N sulfuric acid solution, and water-resin compartments 25 and 29 were packed densely with strongly acidic, sulfonated polystyrene-type cation exchange resin ($RSO_3^-H^+$) and filled with distilled water. The feed compartment 27 was filled with 2.46 N monoethanolamine solution partially protonated with carbon dioxide at 0.277 mole $CO_2$/mole MEA and hydrogen sulfide at 0.275 mole $H_2S$/mole MEA. Compartment 26 was filled with 0.246 N monoethanolamine solution containing 0.1847 mole $CO_2$/mole MEA and 0.0837 mole $H_2S$/mole MEA, and compartment 28 was filled with 1.0 N sulfuric acid solution.

After the cell was in equilibrium with the temperature of the water bath at 25° C., a quantity of current equal to 0.6218 eq./liter was passed through the cell. Carbon dioxide and sulfur precipitate were produced in compartment 28 and the protonated monoethanolamine was regenerated in compartment 26. The monoethanolamine solutions of compartments 26 and 27 were analyzed separately for carbon dioxide by the barium hydroxide method and for hydrogen sulfide by the sodium thiosulfate method. The results indicated that monoethanolamine was quantitatively regenerated and transferred from compartment 27 to compartment 26, and $HCO_3^-$ and $HS^-$ ions were also quantitatively transferred from compartment 27 to compartment 28. Due to difference in ionic mobilities of $HCO_3^-$ and $HS^-$, $HS^-$ ions were preferentially transported from compartment 27 to compartment 28.

EXAMPLE 6

A typical gas purification process using the new regeneration method of modified electrodialysis shown in FIG. 1 was employed. A gas stream of about 50% air and 50% carbon dioxide mixture was continuously introduced into an absorber packed with a bed of spherical glass beads and filled with 2.46 N monoethanolamine solution. As the absorption of carbon dioxide proceeded for three hours to a concentration of 0.601 mole $CO_2$/mole MEA, the partially protonated monoethanolamine solution at 25° C. in the degassing chamber was introduced as feed into the feed compartment 27 of the electrodialysis stack of the type shown in FIG. 2.

The electrodialysis stack was divided into an anode compartment and a cathode compartment each containing a platinum electrode connecting to a D.C. power supply, a unit of intermediate compartments and an extra water-resin compartment. The anode and cathode compartments were filled with 1.0 N sulfuric acid solution, and water-resin compartments 25 and 29 were packed densely with strongly basic, quaternary ammonium polystyrene type anion exchange resin [$RNCCH_3)_3^+Cl^-$] and filled with distilled water. Compartment 26 was filled with 0.615 N monoethanolamine solution containing 0.15 mole $CO_2$/mole MEA, and compartment 28 was filled with 1.0 N sulfuric acid.

After the cell was in equilibrium with the temperature of the water bath at 25° C., a quantity of current equal to 0.529 eq./liter was passed through the cell. Carbon dioxide was continuously produced in compartment 28 whereas analysis of compartment Nos. 27 and 26 by the barium hydroxide method showed that fresh monoethanolamine was quantitatively regenerated and transferred from compartment 27 to compartment 26, and $HCO_3^-$ ions were also quantitatively transferred from compartment 27 to compartment 28.

EXAMPLE 7

An electrodialysis apparatus of the type shown in FIG. 2 was employed. It was divided into an anode compartment and a cathode compartment each containing a platinum electrode connecting to a D.C. power supply, a unit of intermediate compartments and an extra water-resin compartment. The anode and cathode compartments were filled with 1.0 N sulfuric acid solution, and water-resin compartments 25 and 29 were packed densely with weakly acidic, carboxylic (polymethacrylic) type cation exchange resin ($RCOO^-H^+$) and filled with distilled water. The feed compartment 27 was filled with 2.46 N monoethanolamine solution partially protonated with hydrogen sulfide at 0.658 mole $H_2S$/mole MEA. Compartment 26 was filled with 2.46 N monoethanolamine solution containing 0.329 mole $H_2S$/mole MEA, and compartment 28 was filled with 1.0 N sulfuric acid solution.

After the cell was in equilibrium with the temperature of the water bath at 25° C., a quantity of current equal to 0.157 eq./liter was passed through the cell. Sulfur precipitate was continuously produced in compartment 28 during the experiment. The analysis of compartment Nos. 26 and 27 by the sodium thiosulfate method showed that monoethanolamine was quantitatively regenerated and transferred from compartment 27 to compartment 26, and $HS^-$ ions were also quantitatively transferred from compartment 27 to compartment 28.

It will be understood that the foregoing examples are merely illustrative and that various substitutions can be made which would produce equally good results. It will also be recognized that the above constitute a particularly commercially attractive procedure wherein rich alkanolamine solutions are deproportionated and reconstituted into lean alkanolamine solution for reuse in the absorption of acid gases.

There are several commercial advantages to be gained in the use of the process of the present invention. No phase change is involved in the electrodialysis regeneration of absorbents. The energy required to remove ions of relatively minor proportion in the rich solutions is much smaller than that required to steam strip the rich solutions. Since the regeneration of rich solution is effected at or around room temperature, possible degradation of the alkanolamines is minimized. Further, higher capacity of alkanolamine to react with acid gases can be realized as a result of operating the absorber at ambient temperatures rather than at prevailing conditions at 100° C. or higher. Moreover, an extremely lean solution can be obtained and concomitantly removal of "so-called" heat stable salts in the rich solution can be easily achieved.

Finally, due to the comparative ease in removing salts by modified electrodialysis at moderate temperatures, a small amount of caustic may be added to the alkanolamine solutions for the prevention of already minimized corrosion and for the supplemental removal of acid gases in the absorber.

While particular embodiments of this invention have been described and shown, it will, of course, be understood that this invention would not be limited thereto since many modifications may be made and all such modifications are within the true spirit and scope of this invention.

What is claimed is:

1. A process for purifying gas containing acid gases which comprises contacting said gas with an alkanolamine solution under conditions wherein said acid gases are absorbed in said alkanolamine solution to form a rich alkanolamine solution, separating and recovering a gas stream product substantially free of said acid gases, regenerating said rich alkanolamine solution containing said acid gases by introducing said rich alkanolamine solution into an electrodialysis apparatus which includes a cathode compartment containing an electrolyte at one terminal end and an anode compartment containing an electrolyte at the opposite terminal end and at least one unit of compartments disposed between said cathode compartment and said anode compartment, said unit including an ion exchange resin-water compartment containing an ion exchange resin and water, a feed compartment, an acid compartment containing an electrolyte and a product compartment containing a lean alkanolamine solution each of said compartments being separated by alternating cation and an ion exchange membrane beginning with a cation membrane in the cathode compartment and terminating with an anion membrane in the anode compartment, said rich alkanolamine solution being introduced into said feed compartment, and thereafter passing a direct current potential transversely across each compartment, said current being sufficient to generate anions and cations causing anions to pass through said anion membranes and cations to pass through said cation membranes thereby forming a solution containing acid gases in said acid compartment and alkanolamine solution substantially free of acid gases in said product compartment, recycling said alkanolamine solution for further contact with gas, and recovering said acid gases from said acid compartment.

2. A process according to claim 1 wherein said acid gases are carbon dioxide and/or hydrogen sulfide.

3. A process according to claim 1 wherein said ion exchange resin is a strong cation exchange resin.

4. A process according to claim 1 wherein said ion exchange resin is a strong anion exchange resin.

5. A process according to claim 1 wherein said ion exchange resin is a weak anion exchange resin.

6. A process according to claim 1 further characterized in that an ion exchange resin is included in said acid and product compartment.

7. A process according to claim 6 wherein the electrolyte in said acid compartment is water.

8. A process according to claim 1 wherein said alkanolamine solution is an ethanolamine solution.

9. A process according to claim 1 wherein said alkanolamine solution is a monoethanolamine solution.

10. A process according to claim 1 wherein said alkanolamine solution is a diethanolamine solution.

11. A process according to claim 1 wherein the electrolyte introduced into said acid anode and cathode compartments is sulfuric acid.

12. A process according to claim 1 wherein said gas is passed countercurrent to said alkanolamine solution.

13. A process for removing acid gases from alkanolamine solution containing acid gases absorbed therein which comprises introducing said alkanolamine solution into an electrodialysis apparatus which includes a cathode compartment containing an electrolyte at one terminal end and an anode compartment containing an electrolyte at the opposite terminal end and at least one unit of compartments disposed between said cathode compartment and said anode compartment, said unit including an ion exchange resin-water compartment containing an ion exchange resin and water, a feed compartment, an acid compartment containing an electrolyte and a product compartment containing an alkanolamine solution each of said compartments being separated by alternating cation and an anion exchange membrance beginning with a cation membrane in the cathode compartment and terminating with an anion membrane in the anode compartment, said alkanolamine solution being introduced into said feed compartment, and thereafter passing a direct current potential transversely across each compartment, said current being sufficient to generate anions and cations causing anions to pass through said anion membranes and cations to pass through said cation membranes thereby forming a solution containing acid gases in said acid compartment and alkanolamine solution substantially free of acid gases in said product compartment, recovering said alkanolamine solution from said product compartment and recovering acid gases from said acid compartment.

14. A process according to claim 13 wherein said acid gases are carbon dioxides and/or hydrogen sulfide.

15. A process according to claim 13 wherein said ion exchange resin is a strong cation exchange resin.

16. A process according to claim 13 wherein said ion exchange resin is a strong anion exchange resin.

17. A process according to claim 13 wherein said ion exchange resin is a weak anion exchange resin.

18. A process according to claim 13 further characterized in that an ion exchange resin is included in said acid and product compartment.

19. A process according to claim 13 wherein said alkanolamine solution is ethanolamine solution.

20. A process according to claim 13 wherein said alkanolamine solution is a monoethanolamine solution.

21. A process according to claim 13 wherein said alkanolamine solution is a diethanolamine solution.

22. A process according to claim 13 wherein the electrolyte introduced into said acid, anode, and cathode compartments is sulfuric acid.

References Cited

UNITED STATES PATENTS

| | | | |
|---|---|---|---|
| 2,768,945 | 10/1956 | Shapiro | 23—2X |
| 2,815,320 | 12/1957 | Kollsman | 204—180 |
| 3,149,061 | 9/1964 | Parsi | 204—180 |
| 3,344,050 | 9/1967 | Mayland et al. | 23—4X |
| 3,475,122 | 10/1969 | McRae et al. | 23—2X |

EARL C. THOMAS, Primary Examiner

U.S. Cl. X.R.

204—180